US007437871B2

(12) United States Patent
Cook

(10) Patent No.: US 7,437,871 B2
(45) Date of Patent: Oct. 21, 2008

(54) AUTOMATIC ENGINE PROTECTION SYSTEM FOR USE WHEN ELECTRONIC PARTS OF A CONTROL SYSTEM ARE EXPOSED TO OVERTEMPERATURE CONDITIONS

(75) Inventor: Kenneth Foster Cook, Mt. Healthy, OH (US)

(73) Assignee: General Electric Company, Schenectady, NY (US)

( * ) Notice: Subject to any disclaimer, the term of this patent is extended or adjusted under 35 U.S.C. 154(b) by 1239 days.

(21) Appl. No.: 10/160,678

(22) Filed: May 31, 2002

(65) Prior Publication Data

US 2003/0221430 A1 Dec. 4, 2003

(51) Int. Cl.
*F02C 9/26* (2006.01)

(52) U.S. Cl. ................................ 60/39.091; 60/39.281

(58) Field of Classification Search ............. 60/39.091, 60/39.281

See application file for complete search history.

(56) References Cited

U.S. PATENT DOCUMENTS

| | | | | |
|---|---|---|---|---|
| 4,117,670 | A * | 10/1978 | Dombkowsi et al. | 60/39.281 |
| 4,315,296 | A * | 2/1982 | Hancock | 60/39.281 |
| 5,528,897 | A | 6/1996 | Halin | 60/39.094 |
| 5,579,632 | A | 12/1996 | Dutka et al. | 60/39.281 |
| 6,282,882 | B1 | 9/2001 | Dudd, Jr. et al. | 60/39.141 |

* cited by examiner

*Primary Examiner*—Louis J Casaregola
(74) *Attorney, Agent, or Firm*—William Scott Andes

(57) ABSTRACT

An automatic engine protection system for use when electronic parts of the control system are exposed to overtemperature conditions. A thermally sensitive component, such as an engine electronic control or an electronic overspeed control, is mounted on the engine. A thermal fuse is mounted adjacent, or in thermal contact with, the speed control. The thermal fuse is placed in electrical series with a valve which controls fuel delivery to the engine. If the temperature of the fuse exceeds its melting point, indicating a possible danger to the electronic control, the fuse melts, thereby terminating fuel to the engine.

2 Claims, 4 Drawing Sheets

AUTOMATIC ENGINE PROTECTION SYSTEM FOR USE WHEN ELECTRONIC PARTS OF A CONTROL SYSTEM ARE EXPOSED TO OVERTEMPERATURE CONDITIONS

TECHNICAL FIELD

The invention concerns an engine protection system for preventing anomalous engine behavior due to erroneous control system behavior when electronic parts of the control system are exposed to overtemperature conditions.

BACKGROUND OF THE INVENTION

Gas turbine engines are traditionally equipped with some type of control system, speed governor, or both. Early control systems or speed governors were mechanical or hydromechanical. FIG. 1 is a simplified schematic which shows operative principles used by a common type of mechanical speed governor.

A shaft 3, on the left side of the Figure, is connected to a linkage 6, which supports weights 9. The shaft 3 and linkage 6 rotate as indicated by arrow 12. As speed increases, the weights 9 are driven radially outward, in the directions of arrows 15 shown on the right side of the Figure. This radial motion withdraws piston 18 from a valve 21, thereby closing the valve 21 and either (1) shutting down the engine or (2) limiting the speed of the engine.

Advancements in modern electronics, and particularly in integrated circuits, have greatly (1) reduced cost, (2) increased reliability, and (3) increased the amount of functionality which can be contained in relatively small packages. For these reasons and others, the traditional mechanical control system or speed governor is being replaced by electronic control systems and overspeed protection systems.

However, despite the great benefits offered by modern electronic systems, they nevertheless suffer some disadvantages. One disadvantage is sensitivity to heat. For example, certain types of transistors can experience "thermal runaway," wherein a high temperature promotes excessive numbers of carriers into the transistor's conduction band, thereby turning the transistor into a short circuit. The short circuited transistor attempts to conduct a very large current, and destroys itself.

Related phenomenon can occur with solid-state diodes. In addition, printed circuit boards, upon which the solid-state components are mounted, cannot withstand excessive temperatures.

Therefore, when an electronic circuit is used as part of a control system or as an overspeed protection device, in a gas turbine engine for example, the engine must be protected from erroneous control system behavior when the electronic parts of the system are exposed to overtemperature conditions.

SUMMARY OF THE INVENTION

In one form of the invention, temperature of a temperature-sensitive component, or a region near the component, is sensed in a gas turbine engine. If the temperature exceeds a limit, fuel flow to the engine is terminated.

DETAILED DESCRIPTION OF THE INVENTION

Figure 2:
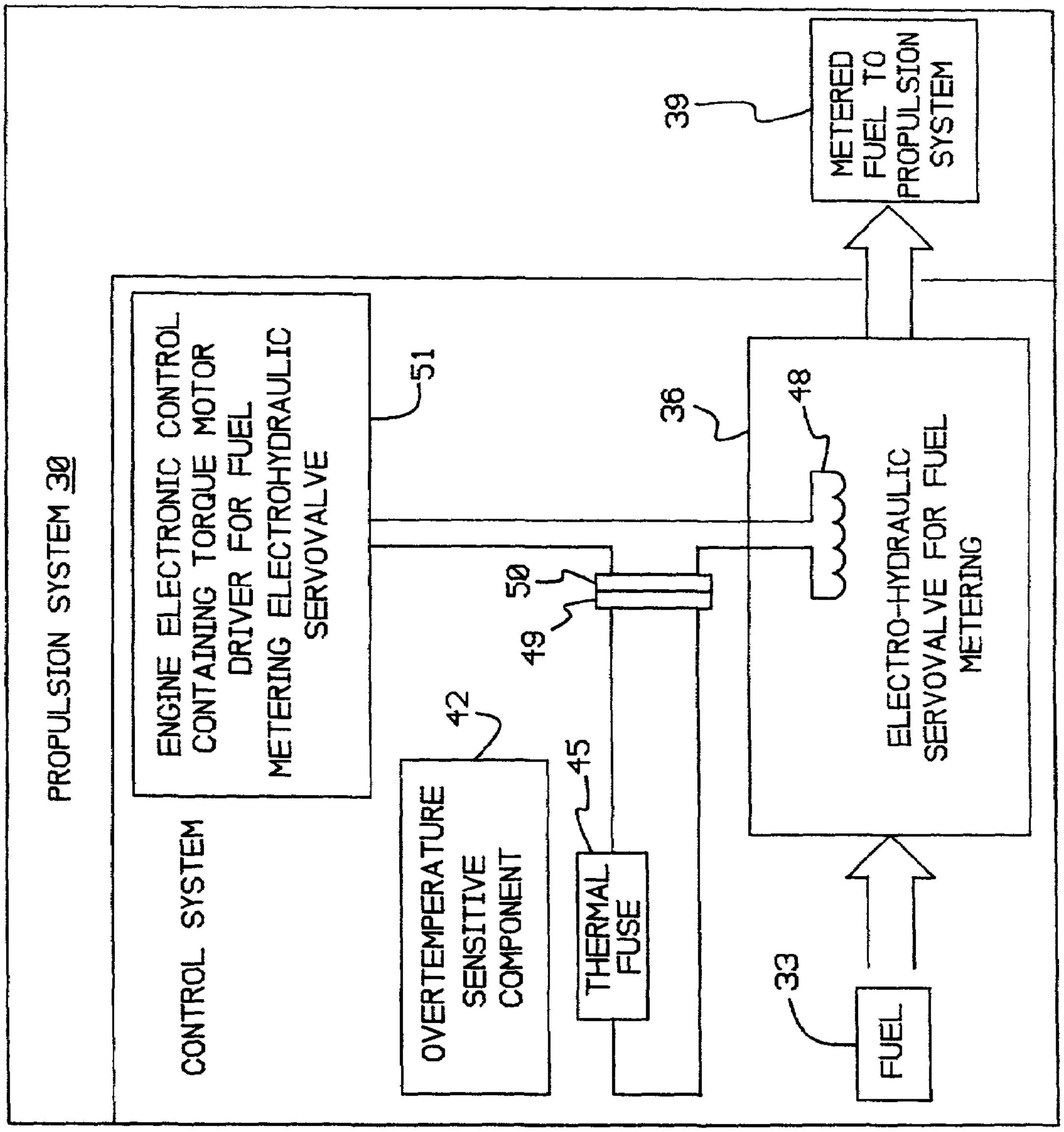
FIG. 2 illustrates a system implementing one form of the invention for an engine control system using an electronic control.

Block 30 in FIG. 2 represents a generalized propulsion system as indicated. A gas turbine engine (not shown) represents one such propulsion system. Fuel 33 is delivered to servovalve 36, which delivers metered fuel 39 to the engine within the propulsion system 30, as indicated.

FIG. 2 also shows a temperature-sensitive component 42, such as an engine electronic control, which monitors engine speed and controls fuel flow to control engine speed. Thermal fuse 45 is mounted adjacent the component 42. In one arrangement, the thermal fuse 45 is mounted in a primary thermal path between a source of heat and the component 42 itself.

The term primary thermal path can be explained by an example. Assume that the source of heat is a candle (not shown). If the component 42 is located one foot directly above the candle, then, in the arrangement under consideration, the thermal fuse 45 would be located between the component 42 and the candle flame. That is, the thermal fuse would be located in the primary thermal path between the flame and the component 42.

This situation is different from another possible situation, wherein the thermal fuse 45 is located above the component 42, that is, the component 42 now lies between the thermal fuse 45 and the candle flame. This arrangement is not precluded by the invention, but the previous arrangement is preferred, wherein the thermal fuse 45 is located between the component 42 and the heat source, in a primary heat path.

The thermal fuse 45 is connected electrically in series with a coil 48, which represents one torque motor coil which operate servovalve 36. Thermal fuse 45 is removably connected by connectors 49 and 50, which can take the form of standard pin-and-socket connectors.

If more than one torque motor control is present, then a separate thermal fuse 45 is preferably provided for each coil.

Servovalve 36 is designed such that, when no current flows through coil 48, the servovalve 36 closes, and no fuel 39 is delivered to the propulsion system 30. A control 51, known in the art, controls the current through the coil 48, thereby controlling the amount of fuel 39 delivered to the propulsion system.

If the temperature at thermal fuse 45 reaches its melting point, thermal fuse 45 melts, thereby becoming an open circuit. The open circuit blocks current to the coil 48, thereby closing servovalve 36. The now-closed servovalve 36 blocks fuel delivery to the propulsion system 30, and the propulsion system 30 shuts down.

It should be observed that component 42 is designed to operate properly in the presence of all normal sources of heat, such as heat produced by engine operation, sunlight or the heating system, HVAC, of an aircraft hangar within which the propulsion system 30 is housed.

Figure 3:
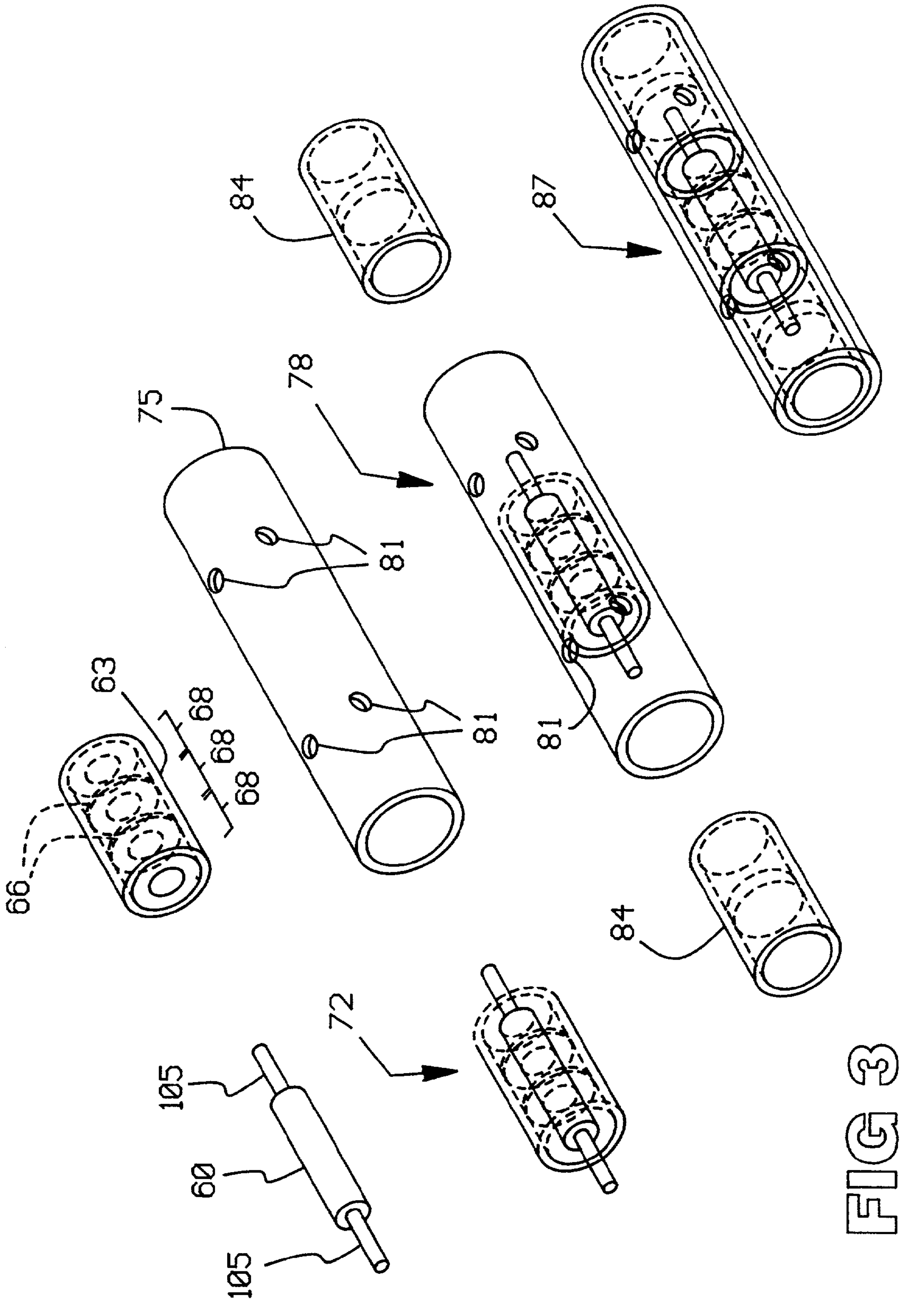
FIG. 3 is a perspective, cutaway view of several steps undertaken in assembling one type of thermal fuse 45 in FIG. 2.

FIG. 3 illustrates a perspective, cutaway view of several steps undertaken in assembling one type of thermal fuse 45 in FIG. 2. It is emphasized that the steps illustrated in FIG. 3 are presented in order to conveniently illustrate structural aspects of the assembled fuse 45 of FIG. 2. These steps are not presented to represent an optimal mode of assembly. For example, housing 63 is shown as a cylinder, but could take the form of two half-cylinders, arranged clamshell style.

In FIG. 3, Fuse element 60 is inserted into a cylindrical housing 63, which contains internal bulkheads 66 which define three chambers 68. After insertion, fuse element 60 and housing 63 form an assembly 72. That assembly 72 is inserted into a second cylindrical housing 75, to form a second assembly 78. Second housing 75 contains perforations 81, which allow ambient air to contact the fuse element 60, to thereby heat the fuse element 60.

Figure 4:
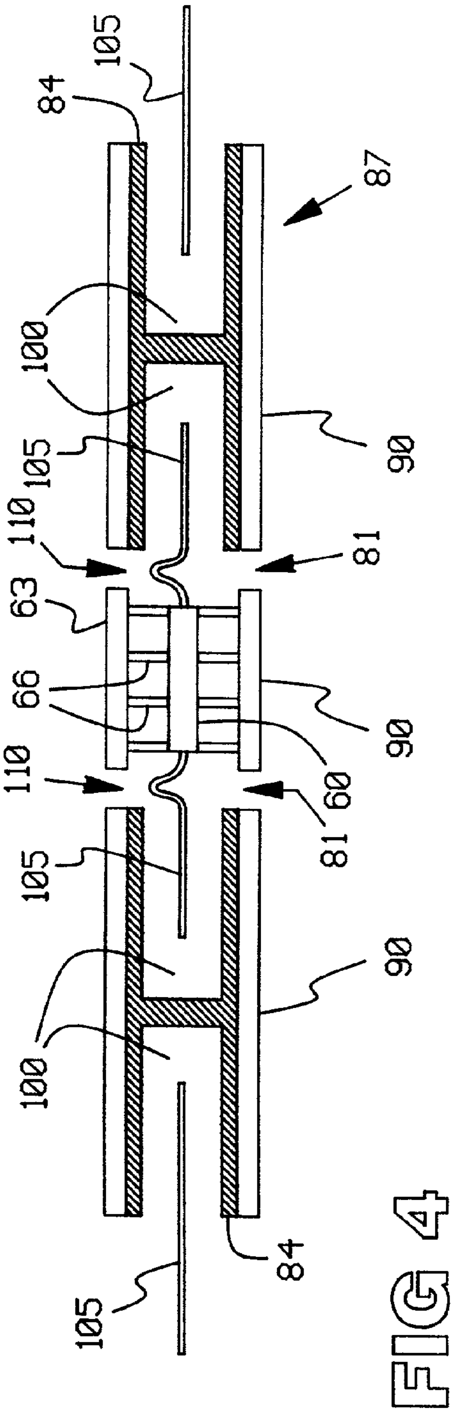
FIG. 4 is a cross-sectional view of the type of fuse shown in FIG. 3.

Connectors 84 are inserted into the second housing 78, to form a third assembly 87. FIG. 4 is a cross-sectional view which includes the third assembly 87. It is emphasized that elements 90 compose a cylindrical shell, and that perforations 81 are merely holes in that shell. That is, the three components labeled 90 do not represent three individual components separated by annular spaces 81. Elements 81 are holes.

Spaces 100 within connectors 84 are diagrammatic, and are not drawn to scale. Those spaces 100 may be filled with solder (not shown), to make contact with wires 105. Alternately, the connectors 84 can take the form of standard crimp-type butt connectors, which are deformed by crimping in order to make contact with wires 105. Deformation is not shown. Other modes of making electrical attachment between wires 105 and connectors 84 are possible.

The wires 105 which connect to the fuse element 60 contain bends 110, which accommodate differential thermal expansion.

Figure 5:
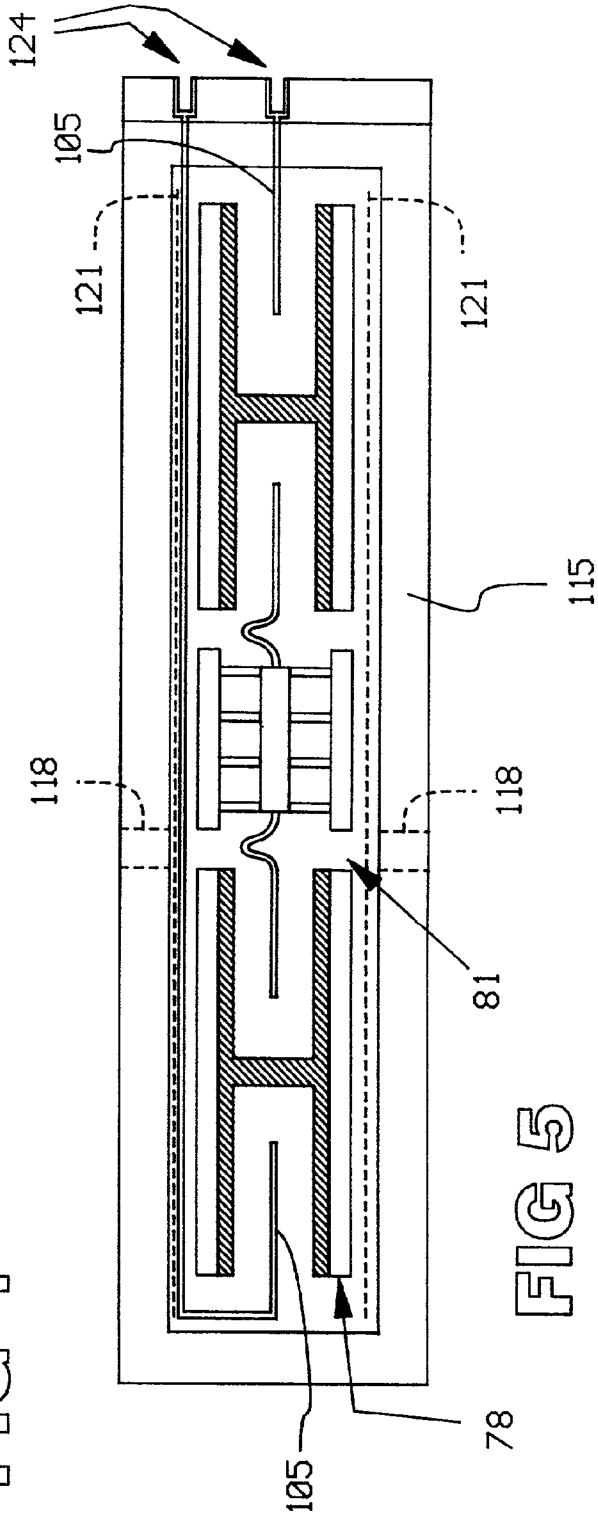
FIG. 5 shows the apparatus of FIG. 4 contained within a housing.

FIG. 5 shows the apparatus of FIG. 4, but contained in a hard protective package 115. The package 115 contains perforations 118 which allow ambient air to communicate with perforations 81 (only two perforations 118 are shown).

Package 115, as well as housings 63 and 78, are preferably constructed of a material which is an electrical insulator. If this material is also thermally conducting, then the response time of the fuse will be shorter. Such materials are known in the art.

The housing 63 in FIG. 3 contains internal chambers 68. The inner surfaces of these chambers 68 will become contacted by melted material emanating from fuse element 60, if it melts. It is not desired that the melted, and possibly re-solidified, material form a conductive path through housing 63.

Consequently, the internal bulkheads 66 act to form a labyrinthine structure. More precisely, any molten material is expected to attempt to form a film which will adhere to the internal surfaces of housing 63. In so doing, that material will be required to spread over surfaces 150 shown in FIG. 6. Those surfaces represent a longer pathway between points A and B, than the original fuse element 60 (not shown) occupied. Thus, since the material is required to span a longer distance, it will necessarily be much thinner, and thus will probably contain gaps.

Further, the statistical likelihood of the material forming a continuous film between points A and B is considered highly unlikely, especially given the fact that several sharp, 90-degree corners 155 are present. Thin films typically do not cover sharp corners well.

Figure 6:
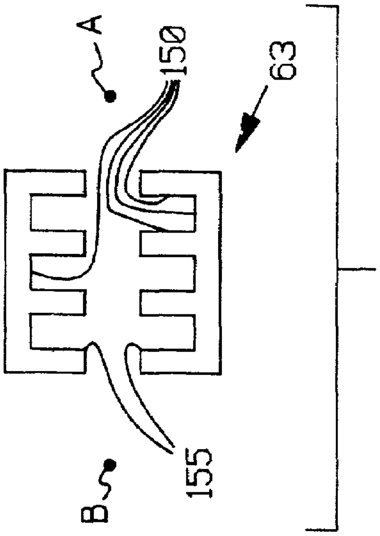
FIG. 6 is an enlarged view of housing 63.
Figure 1:
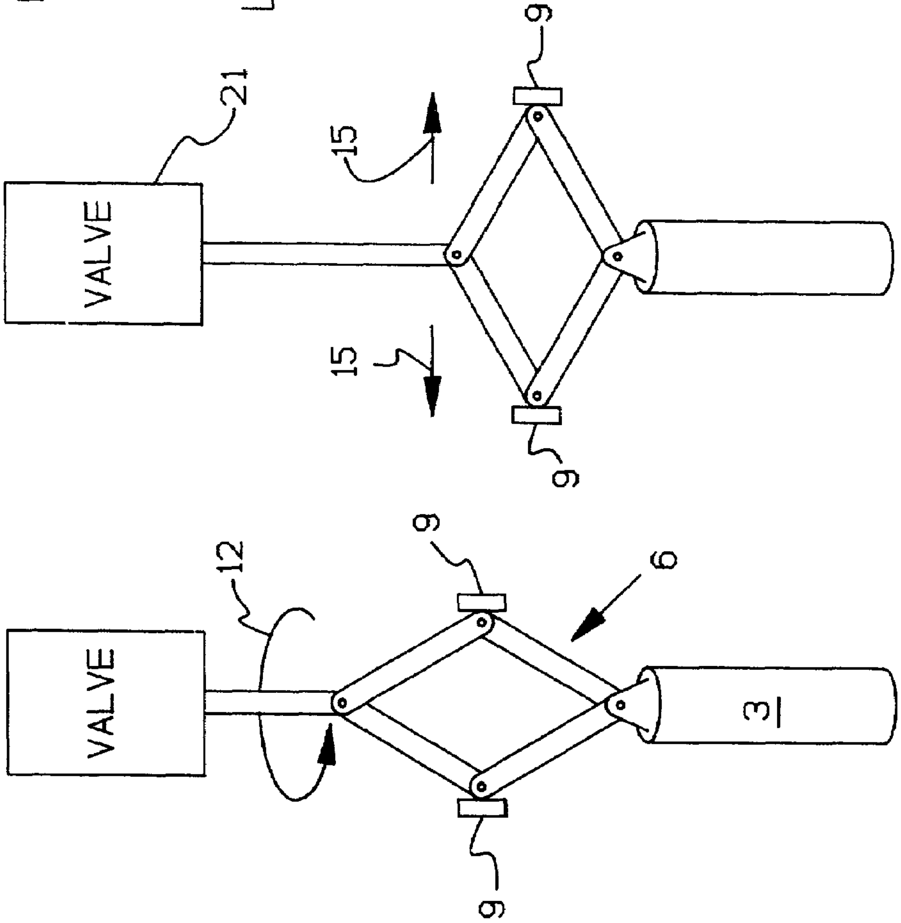
FIG 1 PRIOR ART
FIG. 1 is a simplified schematic of a mechanical speed governor.

In addition, the material of surfaces 150 of the housing 63 in FIG. 6 is constructed is preferably non-wettable by the molten material of which fuse element 60 is constructed. For example, Teflon (™) is one such material.

With the two expedients of (1) non-wetting material and (2) a labyrinthine passage from points A to B in FIG. 6, it is considered extremely unlikely that the molten fuse material will form a conductive bridge between points A and B.

Dashed lines 121 in FIG. 5 represent a woven wire sleeve which surrounds the structure shown in FIG. 4, and acts as electrical shielding. Wires 105 terminate with electrical connectors 124, shown as sockets. These connectors 124 mate with mating connectors, which would be pins in this case, contained in connector 50 in FIG. 2. Pins are not shown.

In one embodiment, the woven wire sleeve 121 may be grounded, in which case an additional connector 124 would be added, and connected to a system ground.

The invention has been described in the context of a gas turbine engine. However, the invention is applicable to numerous apparatus in which (1) fuel is delivered through an electrically controlled valve which blocks fuel flow when current is terminated to the valve and (2) a temperature-sensitive component can be affected by excessive heat due to a fault condition.

The invention places a thermal fuse at a position which represents the temperature environment of the temperature-sensitive component, and places the thermal fuse in electrical series with the valve. When the thermal fuse opens, current is terminated to the valve, thereby terminating fuel flow, and shutting down the engine in an orderly manner.

A thermal fuse is shown in FIGS. 2 and 4. It is not strictly necessary that the fuse melt in order to block current. Thermal circuit breakers are available, and such breakers, or similar apparatus can be used. Stating the preceding another way, one form of the invention focuses on the architecture shown in FIG. 2, and not upon the particular type of thermal fuse used.

One type of thermal fuse used by the invention melts at a temperature of 150° C. In other modes of operation, melting temperatures of 175° C., 200° C., 225° C., 250° C., 275° C., and 300° C. can be used. In yet other modes of operation, different thermal fuses having melting points below the respective temperatures just identified can be used.

An issue of terminology will be addressed. It could be said that any electrical conductor acts as a thermal fuse, because at some temperature that conductor will melt, and thereby become an open circuit. However, the term "thermal fuse" is a term-of-art. It refers to an element which melts, or becomes open-circuited, while the remaining conductors with which it is connected remain fully operative.

In one form of the invention, connectors 84 are not used, but wires 105 are continuous from the fuse element 60 to the connectors 124.

It is not necessary that the fuse 45 in FIG. 2 terminate current to a fuel metering valve. Some, and possibly all, gas turbine engines also contain a main shut-off valve, which is not used for metering. The fuse 45 can control the main shut-off valve. Alternately, two fuses can be used, one for the main shut-off valve, and another for the metering valve, if present.

Numerous substitutions and modifications can be undertaken without departing from the true spirit and scope of the invention. What is desired to be secured by Letters Patent is the invention as defined in the following claims.

The invention claimed is:

1. Apparatus, comprising:

a) an engine which burns fuel;

b) an electrical fuel valve which i) controls fuel delivery to the engine and ii) terminates fuel delivery when no electrical current is received;

c) a conductor which delivers current to the valve;

d) an electronic apparatus which controls or monitors operation of the engine; and e) a thermal fuse i) connected in series with the conductor, and ii) located adjacent the electronic apparatus.

2. A system comprising:

a) a gas turbine engine containing an electronic component and a fuel valve; and b) a thermal fuse which is i) in thermal contact with the electronic component and ii) in electrical series with the fuel valve wherein a high temperature which melts the thermal fuse causes the fuel valve to terminate fuel flow to the engine.

* * * * *